(12) United States Patent
Deffler

(10) Patent No.: US 8,904,348 B2
(45) Date of Patent: Dec. 2, 2014

(54) METHOD AND SYSTEM FOR HANDLING ERRORS DURING SCRIPT EXECUTION

(75) Inventor: Tad A. Deffler, Boonton, NJ (US)

(73) Assignee: CA, Inc., Islandia, NY (US)

( * ) Notice: Subject to any disclaimer, the term of this patent is extended or adjusted under 35 U.S.C. 154(b) by 1457 days.

(21) Appl. No.: 11/733,381

(22) Filed: Apr. 10, 2007

(65) Prior Publication Data
US 2008/0034348 A1 Feb. 7, 2008

Related U.S. Application Data

(60) Provisional application No. 60/745,075, filed on Apr. 18, 2006.

(51) Int. Cl.
G06F 9/44 (2006.01)
G06F 17/30 (2006.01)

(52) U.S. Cl.
CPC ............................. *G06F 17/30377* (2013.01)
USPC ........................... 717/115; 717/127; 718/100

(58) Field of Classification Search
None
See application file for complete search history.

(56) References Cited

U.S. PATENT DOCUMENTS

| | | | |
|---|---|---|---|
| 6,353,923 B1* | 3/2002 | Bogle et al. | 717/128 |
| 2003/0066053 A1* | 4/2003 | Al-Azzawe | 717/127 |
| 2003/0074606 A1* | 4/2003 | Boker | 714/42 |
| 2004/0177337 A1* | 9/2004 | Iida et al. | 717/104 |
| 2005/0256858 A1* | 11/2005 | McArdle | 707/4 |

\* cited by examiner

*Primary Examiner* — Lewis A Bullock, Jr.
*Assistant Examiner* — Christine Dang
(74) *Attorney, Agent, or Firm* — Baker Botts, LLP

(57) ABSTRACT

The present disclosure is directed to a method and system for bulk-loading data into a data storage model. In accordance with a particular embodiment of the present disclosure a script having a plurality of statements is executed. Executing the script includes executing the plurality of statements in a predetermined order. One or more failed statements are identified. Each of the one or more failed statements are re-executed according to the predetermined order.

16 Claims, 3 Drawing Sheets

100

102 — INSERT INTO CUSTOMER (ID, NAME) VALUES (1, 'John Doe')
104 — UPDATE CUSTOMER SET NAME = 'Tom Brown' WHERE ID = 2
106 — DELETE FROM CUSTOMER WHERE NAME = 'Mary Jones'

| | STATUS | DESCRIPTION |
|---|---|---|
| 202 | NOT STARTED | THE STATEMENT HAS NOT BEEN EXECUTED |
| 204 | FAILED | THE STATEMENT WAS EXECUTED, BUT FAILED TO COMPLETE SUCCESSFULLY |
| 206 | SUCCEEDED | THE STATEMENT WAS EXECUTED, AND COMPLETED SUCCESSFULLY |

| | STATEMENT | STATUS |
|---|---|---|
| 222 | INSERT INTO CUSTOMER (ID,NAME) VALUES (1,'John Doe') | NOT STARTED |
| 224 | UPDATE CUSTOMER SET NAME = 'Tom Brown' WHERE ID = 2 | NOT STARTED |
| 226 | DELETE FROM CUSTOMER WHERE NAME = 'Mary Jones' | NOT STARTED |

```
302 — CREATE TABLE SECOND_TABLE
      (
              ID INT,
              FIRST_ID INT,
              FOREIGN KEY (FIRST_ID) REFERENCES FIRST_TABLE (ID)
      )

304 — CREATE TABLE FIRST_TABLE
      (
              ID INT
      )
```

*FIG. 3*

METHOD AND SYSTEM FOR HANDLING ERRORS DURING SCRIPT EXECUTION

CROSS REFERENCE TO RELATED APPLICATIONS

This application claims the benefit of priority under 35 U.S.C. §119(e) of U.S. Provisional Patent Application Ser. No. 60/745,075 entitled "Method and System for Bulk-Loading Data Into a Semantically Live Model," which was filed on Apr. 18, 2006.

TECHNICAL FIELD

The present disclosure relates generally to data storage, and more particularly to a method and system for bulk-loading data into a data storage model.

BACKGROUND

Many applications allow a simple script to make changes to the data held in a data storage model. A simple script is a series of instructions or statements, each of which requests the creation, modification, or deletion of data elements in the data storage model. Often, applications that benefit from scripting have consistency constraints. These constraints may define the order, type, and validity of data that may be created, modified, or deleted. Applications can have consistency constraints that number in the hundreds or thousands and are highly complicated. A failure of just one constraint can cause a whole script to fail and lead to data integrity issues.

For more complex systems, where adherence to these constraints could impose significant burdens, the typical approach is to use a procedural script. A procedural script is a small program employing conditional logic to handle the constraints. This type of script generally involves significantly more effort than a simple script. Further this approach requires that the user be aware of the constraints.

SUMMARY

In accordance with the present disclosure, the disadvantages and problems associated with previous techniques for bulk-loading data into a data storage model may be reduced or eliminated.

In accordance with a particular embodiment of the present disclosure, a method for bulk-loading data into a data storage model includes executing a script having statements. Executing the script includes executing the statements in a predetermined order. The method also includes identifying one or more failed statements. The method further includes re-executing each of the one or more failed statements, according to the predetermined order.

Technical advantages of particular embodiments of the present disclosure include a system and method for bulk-loading data into a data storage model that allows a user to create and run a script without ensuring that all order constraints of the application are followed. Thus, order constraints in the script are dealt with automatically and without manual intervention from the user.

Another technical advantage of particular embodiments of the present disclosure includes a system and method for bulk-loading data into a data storage model that allows a user to create and run a script without ensuring that all data constraints of the application are followed. Accordingly, updates to data may occur without requiring the user to build highly complicated data consistency verifications into the script.

Yet another technical advantage of particular embodiments of the present disclosure includes a system and method for bulk-loading data into a data storage model that allows a user to automate decisions and corrections into a strategy registry. Accordingly, an application may have a pre-defined set of processes and strategies within a software component. Thus, the user may be unaware of the current state of the application's data when creating a script.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which:

FIG. 1 is a pictorial depiction of an example script;

FIG. 2A is a pictorial depiction of an example table with a status for each statement in a script;

FIG. 2B is a pictorial depiction of an example data structure for processing statements in scripts;

FIG. 3 is a pictorial depiction of an example script with an order constraint;

DESCRIPTION OF EXAMPLE EMBODIMENTS

Figure 4:
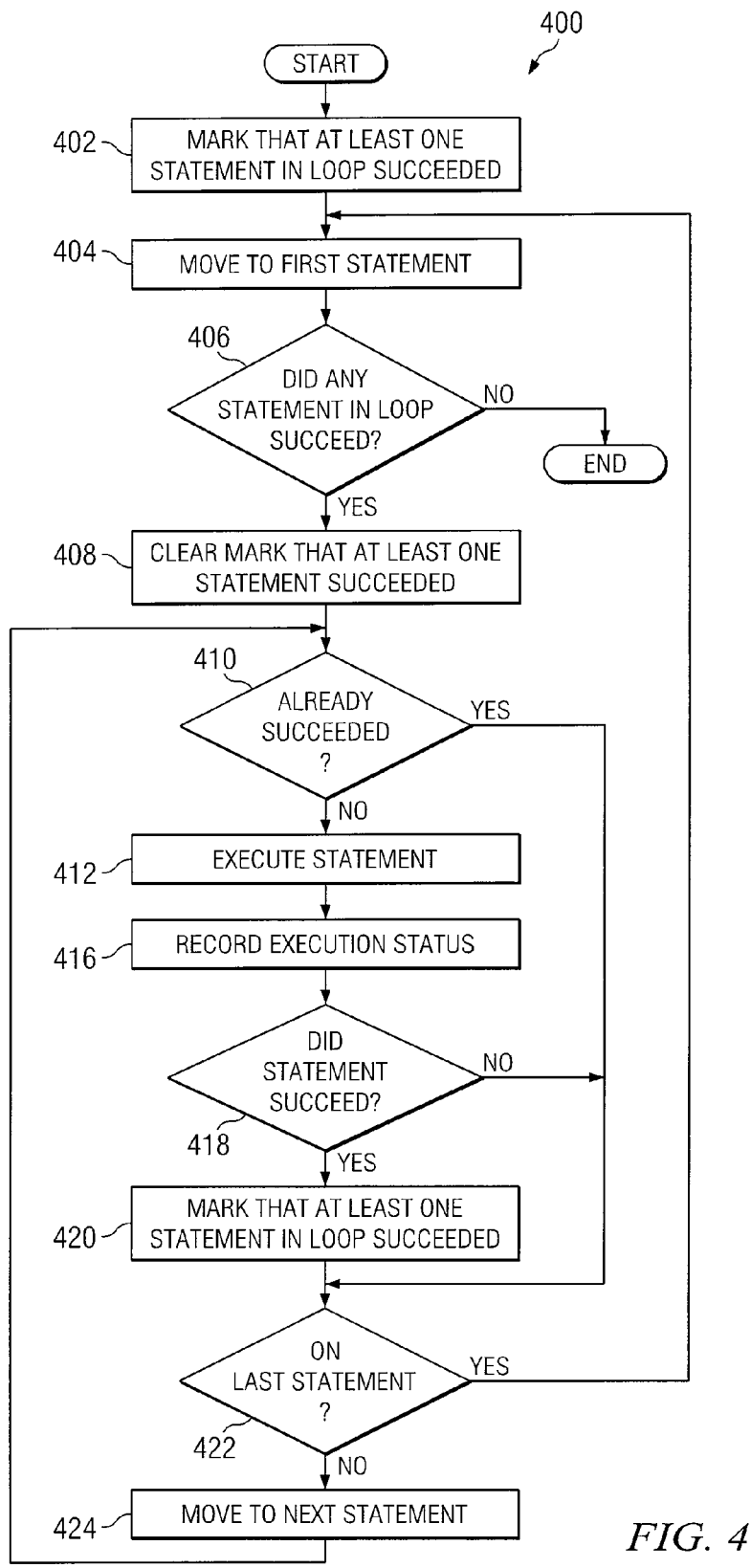
FIG. 4 is a flow diagram illustrating a method for bulk-loading data into a data storage model, according to one embodiment of the present disclosure.

A simple script is a series of statements. A statement is an instruction or a command, each of which requests the creation, modification, or deletion of data elements. One of the most common examples of simple scripts are Structured Query Language (SQL) scripts. SQL scripts are employed by relational databases, where SQL scripts define the data held in the data storage model of the database. SQL scripts are scripts that may comprise a group of SQL statements. A statement may be an instruction such as JOIN, CREATE_TABLE, MODIFY, SELECT, DELETE, or UPDATE. A SQL script may be used by any database management system, whether local or remote, to select, modify, delete, or otherwise process one or more data structures associated with the database.

When updating data storage models with scripts, there are a variety of constraints for the creator of a script to consider. For example, the creator of the script may need to consider order constraints. An order constraint, also referred to as an order dependency constraint, refers to a situation where one piece of data must precede another piece of data. Referring to a table before the table is created in a script is a common example of an order constraint. In a script, if an order constraint is not accounted for, the script may fail to execute properly.

As another example, the creator of the script may need to consider data constraints. A data constraint, also referred to as a data consistency constraint, refers to a situation where certain values or types of data are valid. Data structures that only hold numbers instead of strings are a common example of data constraints. Once again, failure to adhere to these constraints may cause a script to fail.

As another example, a third requirement facing the creator of scripts are redundant data constraints. Redundant data constraints refer to situations where the user wishes to make use of certain pieces of data that may or may not exist in the data storage model. Creating a table a second time in a script is a common example of a redundant data constraint that can cause a script to fail.

One way of dealing with constraints is to deal with them manually. For example, if script fails due to a data constraint, the script is examined, sorted and modified in order to allow it to run successfully. Another approach is to use a procedural script. A procedural script is a small program employing conditional logic to handle the constraints. This type of script generally involves significantly more effort than a simple script. Further, it only allows the user to automate the decisions and corrections. In other words, it does not allow the user to be unaware of the constraints.

In accordance with a particular embodiment of the present disclosure, a series of commands is provided via simple script, and each command is placed into a data structure that holds the statement describing the command plus some information about the status of the statement. This allows for a representation of the execution status for a script at any point in time.

In accordance with another embodiment of the present disclosure, a loop attempts to execute each statement, in order, in the script. When it reaches the end of the script, it re-executes at the beginning. If a statement has a status of 'Succeeded', it is skipped over and not executed. The loop terminates when a complete pass of the script from the first entry to the last entry produces no successful statement executions. This removes order constraint problems by looping over statements that may have failed upon initial execution.

In accordance with another embodiment of the present disclosure, a registry holds strategies used to perform certain statements within a simple script. A registry is a centralized software component that manages mappings between a process and a strategy. The registry may manage the mapping between the process and the strategy. Accordingly, by placing an entry into a registry, an application may define one or more custom processes to be executed for a specific type of simple script command.

A strategy is a software component that implements an algorithm for performing a certain process. For example, the Microsoft Windows clipboard is a well-known feature; it allows the user to copy text or other information from one point in an application and paste that information into another point in the application or even into a separate application. Different applications employ different techniques to fulfill this pre-defined clipboard function. The piece of software that implements a given application's technique would be a strategy. Thus, some applications may employ a strategy that, upon the user selecting the Clipboard Copy command, the application places all the text into the clipboard. Upon the user selecting the Clipboard Paste command, the text is copied to the target destination.

Other applications may employ a strategy that, upon the user selecting the Clipboard Copy command, only a small piece of information is placed in the clipboard. This information allows the application to locate the text the user designated if and when it is ever required. If the user selects the Clipboard Paste command, this small piece of text is used to go locate the desired text and it is copied into the target destination. Still other applications employ both approaches, selecting the appropriate strategy based upon the amount of text involved.

Thus, when running a simple script, the statements are stored in a data structure with a description as to the execution status. Next, a processing loop executes each statement, in order, in the script. When the loop reaches the end of the script, it re-executes at the beginning. The loop terminates when a complete pass of the script from the first entry to the last entry produces no successful statement executions. This provides for allowing the script creator to avoid detecting and manually correcting order constraints. The application may also provide a strategy registry, defining all the processes for dealing with scripts that would otherwise fail. This provides for centralized modifications without having to track down all the scripts that might exist.

FIG. 1 is a pictorial depiction of an example script 100. For example, the script in 100 includes three statements:
'INSERT INTO CUSTOMER (ID,NAME) VALUES (1, 'John Doe') 102;
'UPDATE CUSTOMER SET NAME='Tom Brown' WHERE ID=2 104; and
'DELETE FROM CUSTOMER WHERE NAME='Mary Jones' 106.

FIG. 2A is a pictorial depiction of an example table 200 with a status for each statement in a script. In the illustrated embodiment, a status of 'Not Started' 202 describes a statement not yet executed within the script. A status of 'Failed' 204 describes a statement that executed but failed to complete. A status of 'Succeeded' 206 describes a statement that executed without failure.

FIG. 2B is a pictorial depiction of an example data structure 220 for processing statements in scripts. When a script contains a plurality of statements, each statement may be placed into data structure 220 that holds the statement plus some information about the status of the statement. For example, before execution of the script in FIG. 1, all statements 222, 224, 226 may have the same status of 'Not Started' 202 in FIG. 2A.

FIG. 3 is a pictorial depiction of an example script 300 with an order constraint. For example, FIG. 3 reverses the order of the proper execution of two statements 302 and 304. Because statement 302 refers to FIRST_TABLE before FIRST_TABLE is created in statement 304, the script in FIG. 3 will likely fail.

FIG. 4 is a flow diagram illustrating a method 400 for bulk-loading data into a data storage model, according to one embodiment of the present disclosure. Method 400 comprises a processing loop. The loop attempts to execute each statement, in order in the script. When the loop reaches the end of a script, it re-executes at the beginning. If a statement has a status of 'Succeeded' it is skipped over and not executed to avoid duplicated statements. The loop terminates after a complete pass of the script produces no successful statement executions.

Method 400 begins in step 402, in which the loop marks that at least one statement processed in order to pass the check at step 406 that at least one statement in the loop succeeded. Without step 402 at the beginning, the loop would end the process at 406 without executing a statement in the script. After the loop moves to the first statement in 404, and checks that at least one statement executed successfully in 406, the loop continues processing by clearing the mark that at least one statement executed successfully at 408.

Next, the loop branches at decisional step 410 if the statement already succeeded. If it did not already succeed, the loop continues at step 412 to execute the statement, and record the execution status at step 416. Next, if the statement was successful at decisional step 418, the loop marks that at least one statement executed correctly at step 420. Then, the loop branches at step 422 to process either the next statement at step 424 or start at the top of the script at step 404.

That is, each time the method 400 processes a statement, decisional step 422 determines whether the process reached the end of the script. If the process reaches the end of the script at step 406 and none of the statements in the loop succeeded, the loop terminates.

For example, using the script from FIG. 3, the method 400 would effectively reverse the order of the statements. Therefore the method in 400 would correct the order constraint in the script as follows:

1) The loop attempts to execute statement 302 at step 412 in a first iteration. The statement fails because of the order constraint, and the loop continues to process the next statement 304 at step 424.

2) The loop attempts to execute statement 304 at step 412. It succeeds and the statement is marked 'Succeeded' at step 420.

3) The end of the script is reached at step 422, so the loop returns to statement 302 at step 404 for a second iteration of the script.

4) Statement 304 succeeded, so the loop does not terminate at step 406.

5) The loop attempts to execute statement 302 in the second iteration, which now succeeds at step 412 and is marked 'Succeeded' at step 420.

6) Statement 304 is already marked 'Succeeded', so it is skipped at step 410.

7) The end of the script is reached at step 422, so the loop returns to statement 302 at step 404 for a third iteration of the script.

8) Statement 302 succeeded, so the loop does not terminate at step 406.

9) Statement 302 is already marked 'Succeeded', so it is skipped at step 410 in the third iteration.

10) Statement 304 is already marked 'Succeeded', so it is skipped at step 410 in the third iteration.

11) The end of the script is reached at step 422, so the loop returns to statement 302 at step 404.

12) No statement succeeded in the third iteration, so the loop terminates at step 406.

Figure 5:
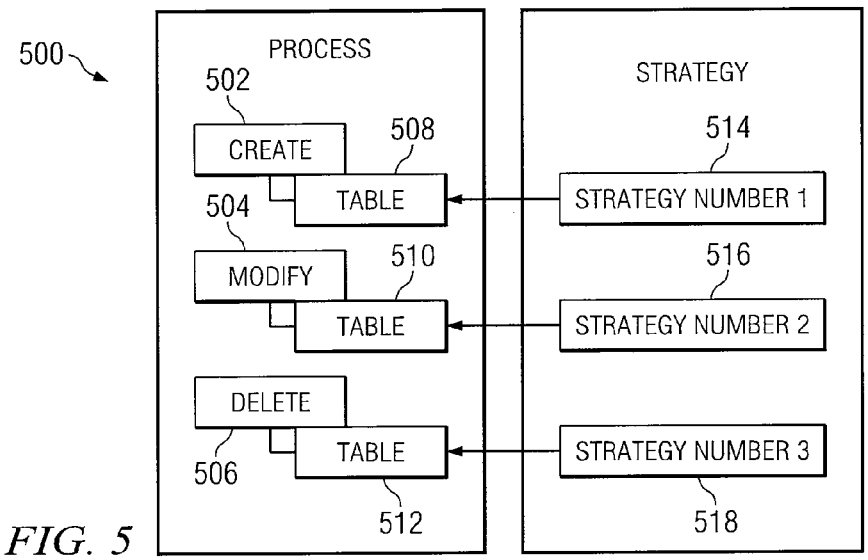
FIG. 5 is a pictorial depiction of an example strategy registry.

FIG. 5 is a pictorial depiction of an example strategy registry 500. By placing an entry in the strategy registry 500, an application can define a custom process to be executed for a specific type of simple script statement. Therefore the application, which has full understanding of its own constraints and of the data already existing within it, can define processes for dealing with scripts that would otherwise fail. This approach frees the user from having to be strictly in compliance with the constraints of the application. Further, as constraints change in the application, the strategies can be modified centrally without modifying all the scripts.

In the illustrated embodiment, the strategy registry 500 defines three high-level processes: Create Data 502, Modify Data 504, and Delete Data 506. It then sub-divides these processes based upon the type of data being affected in the data storage model. For example, in an application that has a data element called 'Table', the strategy registry would have entries for Create Table 508, Modify Table 510, and Delete Table 512.

The present disclosure operates by intercepting each statement to Create Table 508, Modify Table 510, and Delete Table 512 and examining the type of data upon which is will operate. If this data does not match a type for which a strategy is specified, the default operation is attempted. If a strategy does exist, then control is handed over to it to perform its operations.

Figure 6:
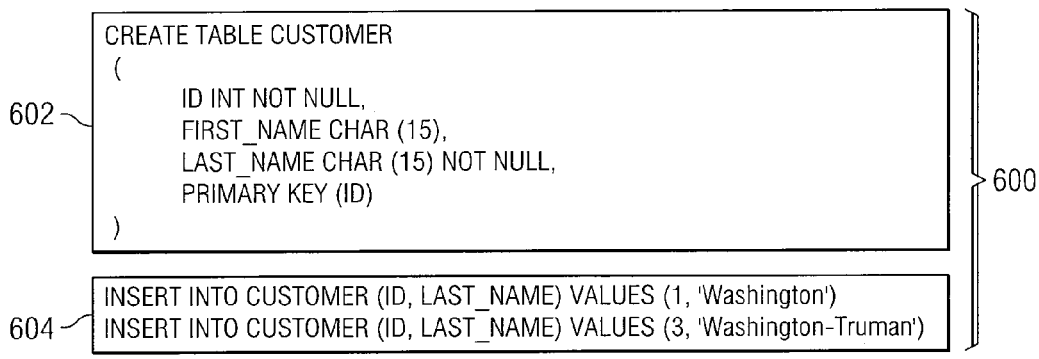
FIG. 6 is a pictorial depiction of an example script with invalid data consistency.

FIG. 6 is a pictorial depiction of an example script 600 with invalid data consistency. Statement 602 of script 600 creates a table CUSTOMER. The CUSTOMER table comprises a numeric field called 'ID', a 15-character text value called 'FIRST_NAME', and a 15-CHARACTER text value called 'LAST_NAME' which is required. Statement 604 includes an invalid statement-modifying the table to add an entry to the table with a text value for 'LAST_NAME' containing too many characters. Here, the application can implement a strategy, such as strategy 516 in strategy registry 500 that truncates or otherwise changes 'Washington-Truman' 616 to make it permissible.

As a second example, script 600 in FIG. 6 may also create a problem with redundant data. If a table named CUSTOMER exists in the database before statement 602 executes, statement 602 will fail. Alternatively, the script author could write a different script to check for the existence of a CUSTOMER table before creation. The strategy registry 500 removes this requirement. An application could implement a strategy 514 in strategy registry 500 that simply reported success if the table already existed, even though 602 performed no operations.

Figure 7:
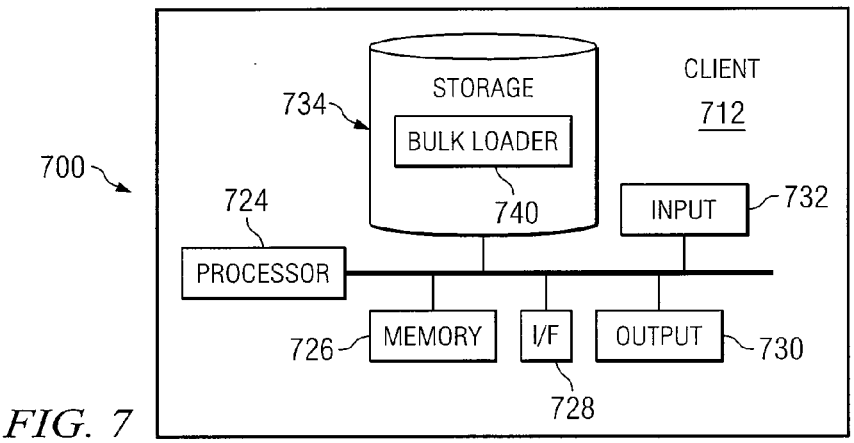
FIG. 7 is a block diagram illustrating a system for bulk-loading data into a data storage model, according to one embodiment of the present disclosure.

FIG. 7 is a block diagram illustrating a system 700 for bulk-loading data into a data storage model, according to one embodiment of the present disclosure. System 700 and each component thereof may comprise hardware, software and/or logic encoded in media that is capable of implementing the method of FIG. 4 and/or other aspects of the teachings of the present disclosure. In the illustrated embodiment, system 700 includes a client 712, a memory device 726, a communication interface (I/F) 728, an output device 730, an input device 732, and a storage device 734. Storage device 734 includes a bulk loader 740. Additional details of the components of client 712 are described below.

Processor 724 may refer to any suitable device operable to execute instructions and manipulate data to perform operations for client 712. Processor 724 may include, for example, any type of central processing unit (CPU).

Memory device 726 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

I/F 728 may refer to any suitable device operable to receive input, send output, perform suitable processing of the input or output or both, communicate to other devices, or any combination of the preceding. I/F 728 may include appropriate hardware (e.g. modem, network interface card, etc.) and software, including protocol conversion and data processing capabilities, to communicate through a LAN, WAN, or other communication system that allows client 712 to communicate to other devices. I/F 728 may include one or more ports, conversion software, or both.

Output device 730 may refer to any suitable device operable for displaying information to a user. Output device 730 may include, for example, a video display, a printer, a plotter, or other suitable output device.

Input device 732 may refer to any suitable device operable to input, select, and/or manipulate various data and information. Input device 732 may include, for example, a keyboard, mouse, graphics tablet, joystick, light pen, microphone, scanner, or other suitable input device.

Storage device 734 may refer to any suitable device operable for storing data and instructions. Storage device 734 may include, for example, a magnetic disk, flash memory, or optical disk, or other suitable data storage device.

Bulk loader 740 may refer to any suitable hardware and/or logic embodied in computer-readable media, and when executed, that is operable to bulk load data into a model as described above with reference to FIG. 4. In the illustrated embodiment of the disclosure, bulk loader 740 resides in storage device 734. In other embodiments of the disclosure, bulk loader 740 may reside in memory device 726, or any other suitable device operable to store and facilitate retrieval of data and instructions.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method for handling errors during script execution, comprising:
   receiving a script having a plurality of statements;
   adding each of the plurality of statements to a data structure, wherein the data structure holds each of the plurality of statements and information about a status of each of the plurality of statements;
   executing each of the plurality of statements in a predetermined order in a first iteration, the first iteration comprising each of the plurality of statements;
   updating, in the data structure, a status of each of the plurality of statements after execution during the first iteration, the status selected from a group comprising completed and failed;
   automatically and continuously performing subsequent iterations until it is determined that the status of each of the statements is completed, wherein performing subsequent iterations comprises:
      determining whether any particular statements of the plurality of statements do not have a status of completed; and
      executing only each of the particular statements that do not have a status of completed, in the predetermined order, in a subsequent iteration; and
      updating the status of any of the particular statements that completed successfully in the subsequent iteration;
   in response to determining that all of the statements have a status of completed after a subsequent iteration, terminating the subsequent iterations.

2. The method of claim 1, further comprising terminating execution of the script.

3. The method of claim 1, further comprising creating a plurality of custom processes executed for at least one statement.

4. The method of claim 3, further comprising storing the custom processes in a centralized software component.

5. The method of claim 3, wherein executing the plurality of statements further comprises executing the custom processes for the at least one statement.

6. A system for handling errors during script execution, comprising:
   a storage device; and
   a processor, the processor operable to execute a program of instructions operable to:
   receive a script having a plurality of statements;
   add each of the plurality of statements to a data structure, wherein the data structure holds each of the plurality of statements and information about a status of each of the plurality of statements;
   execute each of the plurality of statements in a predetermined order in a first iteration, the first iteration comprising each of the plurality of statements;
   update, in the data structure, a status of each of the plurality of statements after execution during the first iteration, the status selected from a group comprising completed and failed;
   automatically and continuously perform subsequent iterations until it is determined that the status of each of the statements is completed, wherein performing subsequent iterations comprises:
      determine whether any particular statements of the plurality of statements do not have a status of completed; and
      execute only each of the particular statements that do not have a status of completed, in the predetermined order, in a subsequent iteration; and
      updating the status of any of the particular statements that completed successfully in the subsequent iteration;
   in response to determining that all of the statements have a status of completed after a subsequent iteration, terminate the subsequent iterations.

7. The system of claim 6, wherein the program of instructions is further operable to terminate execution of the script.

8. The system of claim 6, wherein the program of instructions is further operable to create a plurality of custom processes executed for at least one statement.

9. The system of claim 8, wherein the program of instructions is further operable to store the custom processes in a centralized software component.

10. The system of claim 8, wherein the program of instructions is further operable to execute the custom processes for the at least one statement.

11. Logic encoded in non-transitory media, the logic being operable, when executed on a processor, to:
   receive a script having a plurality of statements;
   add each of the plurality of statements to a data structure, wherein the data structure holds each of the plurality of statements and information about a status of each of the plurality of statements;
   execute each of the plurality of statements in a predetermined order in a first iteration, the first iteration comprising each of the plurality of statements;
   update, in a data structure, the status of each of the plurality of statements after execution during the first iteration, the status selected from a group comprising completed and failed;
   automatically and continuously perform subsequent iterations until it is determined that the status of each of the statements is completed, wherein performing subsequent iterations comprises:
      determine whether any particular statements of the plurality of statements do not have a status of completed; and execute only each of the particular statements that do not have a status of completed, in the predetermined order, in a subsequent iteration; and in response to determining that all of the statements have a status of completed after a subsequent iteration, terminate the subsequent iterations;

automatically and continuously perform subsequent iterations until it is determined that the status of each of the statements is completed, wherein performing subsequent iterations comprises:

determine whether any particular statements of the plurality of statements do not have a status of completed; and execute only each of the particular statements that do not have a status of completed, in the predetermined order, in a subsequent iteration; and updating the status of any of the particular statements that completed successfully in the subsequent iteration;

in response to determining that all of the statements have a status of completed after a subsequent iteration, terminate the subsequent iterations.

12. The logic of claim 11, wherein the logic is further operable to terminate execution of the script.

13. The logic of claim 11, wherein the logic is further operable to create a plurality of custom processes executed for at least one statement.

14. The logic of claim 13, wherein the logic is further operable to store the custom processes in a centralized software component.

15. The logic of claim 13, wherein the logic is further operable to execute the custom processes for the at least one statement.

16. The method of claim 1, wherein executing only each of the particular statements that do not have a status of completed, in the predetermined order, in a subsequent iteration comprises, for each of the particular statements:

determining, based on the particular statement, whether an alternative process for handling the particular statement exists; and in response to determining that an alternative process for handling the particular statement exists, executing the alternative process instead of re-executing the particular statement.

* * * * *